2 Sheets—Sheet 1.
S. J. HAYES, E. T. JEFFERY, & H. SCHLACKS.
Purifying Feed-Water for Boilers.
No. 226,068　　　　　　　　Patented Mar. 30, 1880.
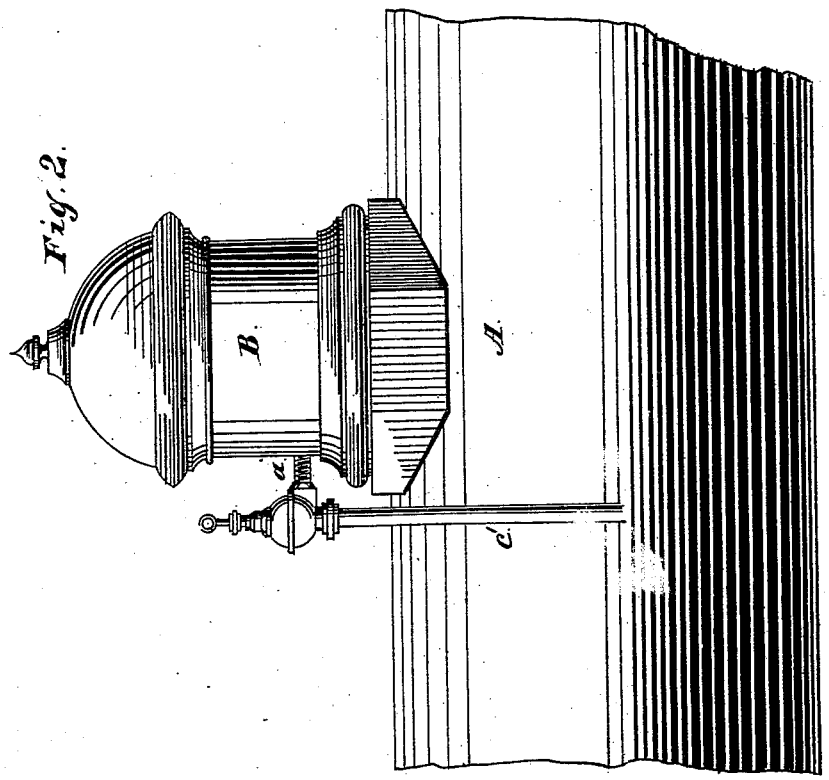
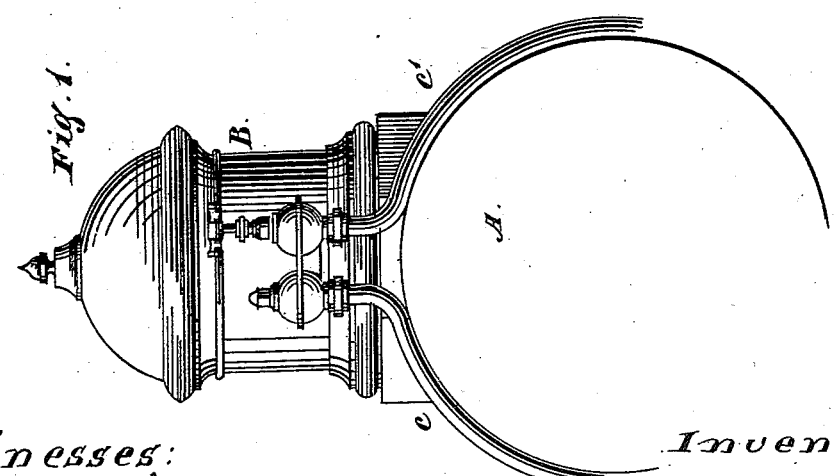

2 Sheets—Sheet 2.
S. J. HAYES, E. T. JEFFERY, & H. SCHLACKS.
Purifying Feed-Water for Boilers.
No. 226,068. Patented Mar. 30, 1880.
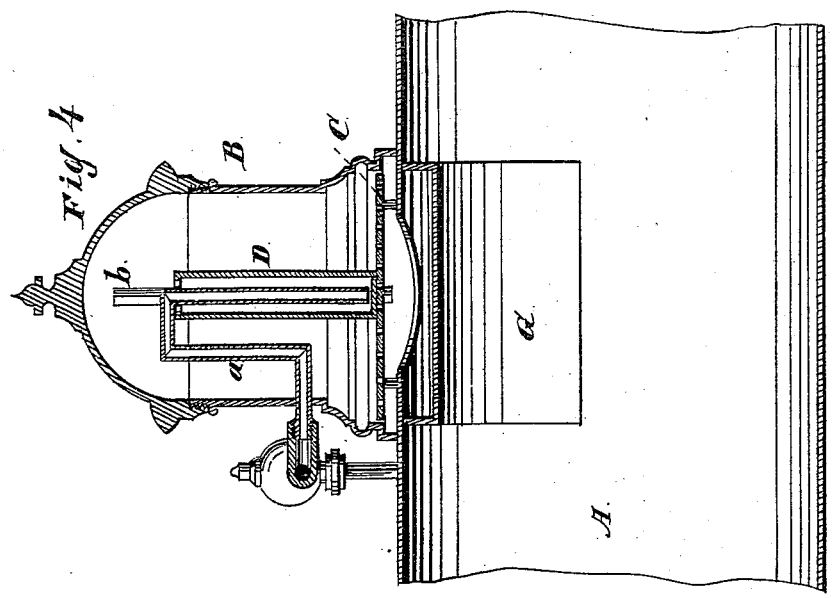
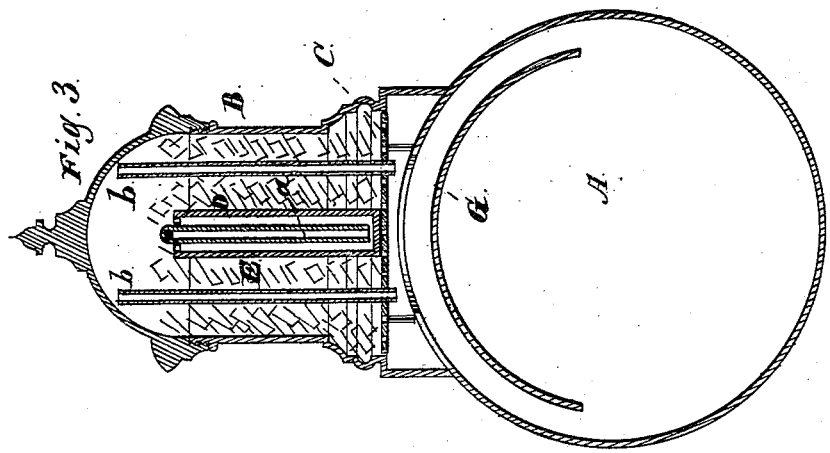

UNITED STATES PATENT OFFICE.

SAMUEL J. HAYES, EDWARD T. JEFFERY, AND HENRY SCHLACKS, OF CHICAGO, ILLINOIS.

PURIFYING FEED-WATER FOR BOILERS.

SPECIFICATION forming part of Letters Patent No. 226,068, dated March 30, 1880.

Application filed January 23, 1880.

*To all whom it may concern:*

Be it known that we, SAMUEL J. HAYES, EDWARD T. JEFFERY, and HENRY SCHLACKS, residing at Chicago, in the county of Cook and State of Illinois, and citizens of the United States, have invented a new and useful Improvement in the Mode of Purifying Feed-Water for Boilers, of which the following is a full description, reference being had to the accompanying drawings, in which—

Figure 1 is an end elevation. Fig. 2 is a side elevation. Fig. 3 is a vertical cross-section; Fig. 4, a vertical longitudinal section.

This invention is an improvement on devices shown in Letters Patent of the United States heretofore granted to us for purifying the feed-water of boilers.

As shown and described in that patent, the feed-water enters the dome of a steam-boiler in the space at the top thereof, and passes down over and between scraps of iron or other suitable substances with which the greater part of the dome is filled, the lime and many other substances which are held in solution in the water being deposited on such scraps or other material, the water passing directly from the top of the dome to the boiler.

The object of our present invention is to retain the feed-water in the dome or other suitable receptacle longer than can be done with the devices described in said patent, and to raise the feed-water to a higher temperature before it leaves the dome than can be done under said patent, for the purpose of more perfectly separating the impurities from the water, which we accomplish by providing in the dome or other chamber for the scrap a long receptacle, into which the feed-water is introduced, and from which it flows over the top onto the scrap, and by providing pipes for the passage of steam from the boiler to the top of the dome, thus aiding to maintain the feed-water at a high temperature, all as hereinafter more fully set forth.

In the drawings, A represents a steam-boiler. B is the steam-dome. C is a perforated plate in the bottom of the dome and over the opening in the boiler.

D is a water-receptacle having openings at the top, or it may be wholly open at the top, but is tight elsewhere. It rests upon the plate C.

$a$ is a tube for the admission of the feed-water. It passes into the receptacle D at the top and extends nearly to the bottom thereof.

$b\ b$ are two tubes for the passage of steam from the boiler into the upper part of the dome. They are about two inches in diameter, or they may be larger. They are open both at the top and bottom, and, as shown, extend a little way through the plate C.

E is a quantity of scrap-iron or other suitable material to receive the deposit from the water. In Fig. 4 the scrap is omitted, for the purpose of showing more clearly the devices in the dome.

$c\ c'$ are water-pipes, one leading from the pump, the other from the injector, both of which communicate with the pipe $a$.

G is a shield in the boiler to prevent the water from the dome from falling directly upon the boiler-tubes.

The operation is as follows: Feed-water may be introduced either from the pump or injector, or both, and it will be conveyed through the tube $a$ to the bottom of the receptacle D; and D having no openings except at the top, the water will be forced to flow up through the receptacle D, and will flow out at the top, and pass onto, over, and down through the scrap or other material F, and a very large percentage of the lime and of various other impurities in the feed-water will be deposited on such scrap or other material.

Steam can, of course, pass up through the spaces between the scrap into the space in the top of the dome; but a higher temperature can be maintained by the use of the tubes $b\ b$, through which steam can pass more directly than through the scrap.

By introducing the feed-water as described it will remain in the dome longer than when introduced directly into the dome, as in our former patent, and hence will be raised to a higher temperature, while the introduction of steam into the upper part of the dome through the tubes $b\ b$ will aid in maintaining the desired temperature favorable to the deposition of the impurities.

The feed-water can be conveyed into the dome at any suitable point.

When required a receptacle for the scrap may be expressly provided. The scrap is to be removed and cleaned, or replaced, as often as may be necessary.

If desired, a perforated plate may be placed in the dome near the top of the receptacle D, so arranged that the water will flow onto it and be distributed over it and over the scrap.

We have shown a locomotive-boiler. Our improvement can be used with other boilers.

Where there is no steam-dome a suitable chamber for the steam can be provided, located in any convenient position, and suitably connected with the boiler.

What we claim as new, and desire to secure by Letters Patent, is as follows:

1. The combination of a steam dome or chamber, B, water-receptacle D, and inlet water-pipe $a$, substantially as and for the purposes set forth.

2. The combination of a steam dome or chamber, B, a water-receptacle, D, an inlet water-pipe, $a$, and one or more pipes, $b$, for the passage of steam, substantially as and for the purposes set forth.

3. The combination of the boiler A, dome B, water-receptacle D, inlet-pipe $a$, steam-pipes $b$, perforated plate C, and shield G, substantially as and for the purposes set forth.

SAMUEL J. HAYES.
       EDWARD T. JEFFERY.
       HENRY SCHLACKS.

Witnesses:
  THOS. J. TUSTIN,
  ALBERT W. SULLIVAN.